United States Patent
Peyravian et al.

(10) Patent No.: US 6,560,337 B1
(45) Date of Patent: May 6, 2003

(54) SYSTEMS, METHODS AND COMPUTER PROGRAM PRODUCTS FOR REDUCING EFFECTIVE KEY LENGTH OF CIPHERS USING ONE-WAY CRYPTOGRAPHIC FUNCTIONS AND AN INITIAL KEY

(75) Inventors: Mohammad Peyravian, Cary, NC (US); Stephen Michael Matyas, Jr., Manassas, VA (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,464

(22) Filed: Oct. 28, 1998

(51) Int. Cl.[7] ................................................ H04L 9/08
(52) U.S. Cl. ...................... 380/44; 380/47; 380/262; 380/264; 380/277; 711/216
(58) Field of Search .............................. 380/44, 47, 22, 380/277, 276, 262, 264; 713/189, 193; 711/216

(56) References Cited

U.S. PATENT DOCUMENTS

| | | | |
|---|---|---|---|
| 4,200,770 A | | 4/1980 | Hellman et al. .............. 178/22 |
| 4,218,582 A | | 8/1980 | Hellman et al. .............. 178/22 |
| 4,405,829 A | | 9/1983 | Rivest et al. ............... 178/22.1 |
| 4,424,414 A | | 1/1984 | Hellman et al. .......... 178/22.11 |
| 5,216,715 A | * | 6/1993 | Markwitz .................... 380/273 |
| 5,297,207 A | * | 3/1994 | Degele ......................... 380/46 |
| 5,323,464 A | | 6/1994 | Elander et al. ................ 380/24 |
| 5,416,841 A | * | 5/1995 | Merrick ......................... 380/29 |
| 5,659,618 A | * | 8/1997 | Takahashi et al. ............. 380/49 |
| 5,805,705 A | | 9/1998 | Gray et al. .................... 380/48 |
| 6,173,384 B1 | * | 1/2001 | Weaver ....................... 370/229 |

FOREIGN PATENT DOCUMENTS

WO  WO 98/45980 A2 * 10/1998 ............ H04L/9/00

OTHER PUBLICATIONS

Accredited Standards Committee X9, "*X9.69 Key Management Extensions*", American Bankers Assocication, Aug. 6, 1998.

Harney et al., "*Group Key Management Protocol (GKMP) Specification*", IETF RFC–2098, Jul. 1997.

Harney et al., "*Group Key Management Protocol (GKMP) Architecture*", IETF RFC–2094, Jul. 1997.

Ballardie, "*Scalable Multicast Key Distribution*", IETF RFC–1949, May 1996.

Rivest, "*The RC5 Encryption Algorithm*", Dr. Dobb's Journal, Jan. 1995, pp. 146–152.

Massey, "*SAFER K–64: A Byte–Oriented Block–Ciphering Algorithm*", Fast Software Encryption, Cambridge Security Workshop Proc., Springer–Verlag, 1994, pp. 1–17.

Schneier, "*The Blowfish Encryption Algorithm*", Dr. Dobb's Journal, Apr. 1994, pp. 38, 40.

Johnson et al., "*The Commercial Data Masking Facility (CDMF) Data Privacy Algorithm*", IBM J. Res. Development, vol. 38, No. 2, Mar. 1994, pp. 217–226.

Schneier, "*The IDEA Encryption Algorithm*", Dr. Dobb's Journal, Dec. 1993, pp. 50, 52, 54, 56, 106.

* cited by examiner

Primary Examiner—Justin T. Darrow
(74) Attorney, Agent, or Firm—Myers Bigel Sibley & Sajovec; Jeanne S. Ray-Yarletts

(57) ABSTRACT

Systems, methods and computer program products reduce effective key length of a symmetric key cipher by deriving an intermediate value from an initial key, using a one-way cryptographic function. Predetermined bit locations of the intermediate value are selected to obtain an intermediate key. An intermediate shortened key is derived from the intermediate key by setting predetermined bit locations of the intermediate key to predetermined values. A diffused intermediate shortened key is derived from the intermediate shortened key using the one-way cryptographic function. Predetermined bit locations of the diffused intermediate shortened key are then selected to obtain a shortened key. In first embodiments, the one-way cryptographic function is a one-way hash function. Second embodiments use the symmetric key cipher itself to perform the one-way cryptographic function.

24 Claims, 3 Drawing Sheets

SYSTEMS, METHODS AND COMPUTER PROGRAM PRODUCTS FOR REDUCING EFFECTIVE KEY LENGTH OF CIPHERS USING ONE-WAY CRYPTOGRAPHIC FUNCTIONS AND AN INITIAL KEY

FIELD OF THE INVENTION

This invention relates to ciphering systems, methods and computer program products, and more particularly to systems, methods and computer program products for reducing effective key length of ciphers.

BACKGROUND OF THE INVENTION

Symmetric-key ciphers are widely used for encryption in both commercial and government applications to protect the privacy and integrity of a wide variety of information. The strength of a symmetric-key cipher is generally tied to its key length. Typically, as the number of independent key bits increases the cipher becomes stronger.

There are many symmetric-key block ciphers with different key lengths which can offer different levels of security, flexibility, and efficiency. These include DES, RC5, CAST, Blowfish, FEAL, SAFER, and IDEA. For example, DES uses a 56-bit key to encrypt a 64-bit input plaintext to produce a 64-bit output ciphertext. These ciphers are described for example, in Rivest, "The RC5 Encryption Algorithm", Dr. Dobb's Journal, Vol. 20, No. 1, January 1995, pp. 146–148; Schneier, "*The Blowfish Encryption Algorithm*", Dr. Dobb's Journal, Vol. 19, No. 4, April 1994, Pages 38–40; National Bureau of Standards, "*Data Encryption Standard*", FIPS PUB 46, January 1977; Massey, "*SAFER K-64: A Byte-Oriented Block-Ciphering Algorithm*", Fast Software Encryption, Cambridge Security Workshop Proceedings, Springer-Verlag, 1994, pp. 1–17; Adams, "*Constructing Symmetric Ciphers Using the CAST Design Procedure*", Design, Codes, and Cryptography, Vol. 12, No. 3, November 1997, pp. 283–316; and Schneier, "*The IDEA Encryption Algorithm*", Dr. Dobb's Journal, Vol. 18, No. 13, December 1993, pp. 50–56. The disclosures of all these publications are hereby incorporated herein by reference.

When used in commercial applications, data encryption is often subject to government regulations limiting the use, import and/or export of equipment supporting data privacy to certain key lengths. For example, under the United States Department of Commerce regulations, when the keys are limited to 40 bits, products supporting data encryption are generally exportable. Also, when work on key recovery is undertaken, export of DES with 56-bit key is generally allowed. Therefore, depending on the type of application or regulations, the key size may need to be varied.

Unfortunately, many ciphers are not designed to support variable key length. Moreover, even if a cipher supports variable key length, it is often desirable to reduce the "effective key length" (i.e., the number of independent key bits) rather than the actual key length in order to be able to use the same key management and key exchange protocols independent of the application or regulations. The effective key length of a cipher can be reduced by reducing the number of independent key bits in the key. This process is also referred to as "key shortening".

Key shortening generates a "shortened key" form an initial ("long") key. Thus, key shortening reduces the effective key length of the initial key without affecting its actual length. For example, denote the initial and shortened keys by K and K', respectively. Let l be the actual length of K (or K') in bits and let r be the number of bits by which K has to be shortened. Thus, the effective length of K' is l–r bits.

One technique to derive K' from K is to set r specific bits of K to some publicly known constant values. For example, the r left-most bits of K can be set to zero. Unfortunately, K' becomes weaker than K by r bits since r bits of K' are constant values which are known to the public. Thus, this key shortening technique which fixes some of the key bits to some publicly known constant values, is potentially susceptible to "short-cut" attacks. That is, the work factor required to break the shortened key K' may be less than $2^{l-r}$, due to the way some ciphers work.

For example, DES includes 16 rounds of identical operations in which the data is mixed with the key. For each round, a key transformation algorithm derives a sub-key from the initial 56-bit key. In each round, a sub-key is mixed with the data. The way the DES key transformation algorithm works, it preserves the initial key bits. Thus, if some of the initial key bits are fixed, then these fixed bits will propagate into the sub-keys, reducing the entropy of the sub-keys. That is, some of the bits in the sub-keys will have known values. This may lead to short-cut attacks. To avoid such a problem, a key shortening scheme preferably should produce a shortened key from an initial key that is pseudo-random with no fixed bits.

Another potential issue with such a key shortening scheme is that exposure of the shortened key K' may reveal information about the initial key K. That is, if K' is exposed, an exhaustive search for K may take only $2^r$ trials. This can be a problem since in some applications, it might be desirable to use both the keys for two different sessions, one for a "strong session" and one for a "weak session".

The Commercial Data Masking Facility (CDMF) key shortening scheme can avoid these issues. CDMF is described in U.S. Pat. No. 5,323,464 to Elander et al., entitled "*Commercial Data Masking*", assigned to the assignee of the present invention, the disclosure of which is incorporated by reference herein in its entirety. CDMF is also described in Johnson et al., "*The Commercial Data Masking facility (CDMF) Data Privacy Algorithm*", IBM Journal of Research and Development, Vol. 38, No. 2, March 1994, pp. 217–226; and Johnson et al., "*Design of the Commercial Data Masking Facility Data Privacy Algorithm*", $1^{st}$ ACM Conference on Computer and Communications Security, ACM Press, 1993, pp. 93–96, the disclosures of which are incorporated by reference herein in their entirety. CDMF generates a pseudo-random 40-bit DES key with no fixed bits from a 56-bit key. Given a 64-bit DES key (including the 8 parity bits), the CDMF derives a 40-bit key using the following steps:

1. Set the parity bits (i.e., bits 8, 16, 24, 32, 40, 48, 56, and 64) in the key to 0.
2. Encrypt the output of Step 1 using DES and the key 0Xc408b0540ba1e0ae.
3. EXCLUSIVE-OR (XOR) the results of Steps 1 and 2.
4. Zero the parity bits (i.e., bits 8, 16, 24, 32, 40, 48, 56, and 64) and the following 16 bits in the output of Step 3: bits 1, 2, 3, 4, 17, 18, 19, 20, 33, 34, 35, 36, 49, 50, 51, and 52.
5. Encrypt the output of Step 4 using DES and the key 0Xef2c041ce6382fe6.
6. Set the parity bits (i.e., bits 8, 16, 24, 32, 40, 48, 56, and 64) in the result of Step 5 if desired.

The output of step 6 is the CDMF-derived shortened key which is used in a standard DES invocation.

Notwithstanding the improvement of CDMF, there continues to be a need for improved systems, methods and computer program products for reducing effective key length of ciphers. Key length reducing systems, methods and computer program products should preferably be generic in the sense that they can be used with any cipher and any size key, and can generate a shortened key which is of the same length as the initial long key.

SUMMARY OF THE INVENTION

The present invention includes systems, methods and/or computer program products that reduce effective key length of a symmetric key cipher by deriving an intermediate value from an initial key, using a one-way cryptographic function. Predetermined bit locations of the intermediate value are selected to obtain an intermediate key. An intermediate shortened key is derived from the intermediate key by setting predetermined bit locations of the intermediate key to predetermined values. A diffused intermediate shortened key is derived from the intermediate shortened key using the one-way cryptographic function. Predetermined bit locations of the diffused intermediate shortened key are then selected to obtain a shortened key.

Systems, methods and/or computer program products for reducing effective key length of a symmetric key cipher according to the invention can be used with any cipher and any size key, and can generate a shortened key which is of the same length as the initial (long) key. These systems, methods and/or computer program products can be cryptographically strong, and can produce shortened keys that may not be susceptible to short-cut attacks. Additionally, exposure of the shortened key need not reveal any information about the initial key. Modifications to existing key management systems need not be made, and preestablished and dynamically established keys may be used. Existing key exchange protocols may be used to distribute long keys which are shortened using systems, methods and/or computer program products according to the present invention.

In first embodiments of the invention, the one-way cryptographic function is a one-way hash function. An intermediate value is derived from an initial key by concatenating one-way hashes of the initial key and a predetermined number of increments of the initial key. A diffused intermediate shortened key is derived from the intermediate shortened key by concatenating one-way hashes of the diffused intermediate shortened key and a predetermined number of increments of the diffused intermediate shortened key. Thus, a one-way hash function and the initial key are used to derive a shortened key.

Second embodiments of the invention use the symmetric key cipher itself to perform the one-way cryptographic function. The initial key is divided into a plurality of initial key subblocks. In order to derive an intermediate value from the initial key, a predetermined number of EXCLUSIVE-ORs of a function of a preceding initial key subblock, a succeeding initial key subblock and an encryption of the succeeding initial key subblock under the initial key are recursively concatenated. The intermediate shortened key is divided into a plurality of intermediate shortened key subblocks. A diffused intermediate shortened key is derived from the intermediate shortened key by recursively concatenating a predetermined number of EXCLUSIVE-ORs of a function of a preceding intermediate shortened key subblock, succeeding intermediate shortened key subblock and an encryption of the succeeding intermediate shortened key subblock under the intermediate shortened key. Accordingly, the cipher itself and the initial key are used to generate a shortened key.

Systems, methods and/or computer program products according to the invention can therefore derive a shortened key from an initial key by performing at least one-way cryptographic function using the initial key and no other key. The at least one-way cryptographic function can be a one-way hash function and/or a symmetric key cipher, that use the initial key and no other key. Improved systems, methods and/or computer program products for reducing effective key length of ciphers may thereby be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
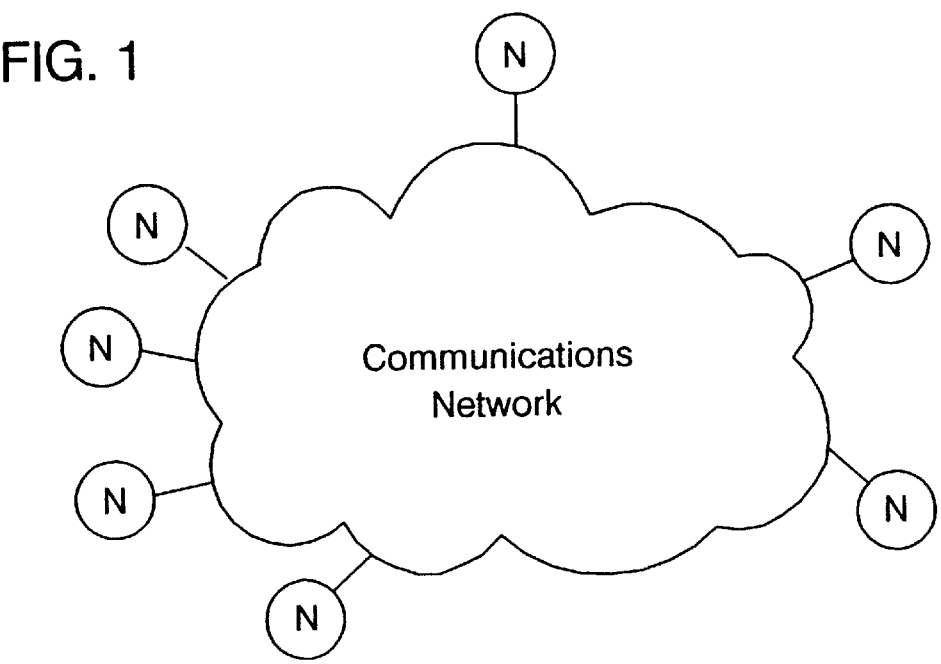
FIG. 1 illustrates a communications network including systems, methods and computer program products for reducing effective key length of ciphers according to the present invention.

Referring now to FIG. 1, a communications network including systems, methods and/or computer products for reducing effective key length of ciphers according to the present invention is shown. As shown in FIG. 1, the communications network includes a plurality of nodes N that are connected thereto for communication among the nodes N. It will be understood that each of the nodes N can be mainframe, mid-range and personal computers, workstations, radiotelephones, application programs such as client and server programs, devices such as smart cards and cryptographic adapters, and combinations thereof. Communications networks may include wired and wireless communications networks, local area networks, the Internet, buses that connect two or more nodes, and combinations thereof. Moreover, it will be understood that a message sent over the communications network may be encrypted, and may stay encrypted until it is decrypted by the intended recipient or recipients.

Figure 2:
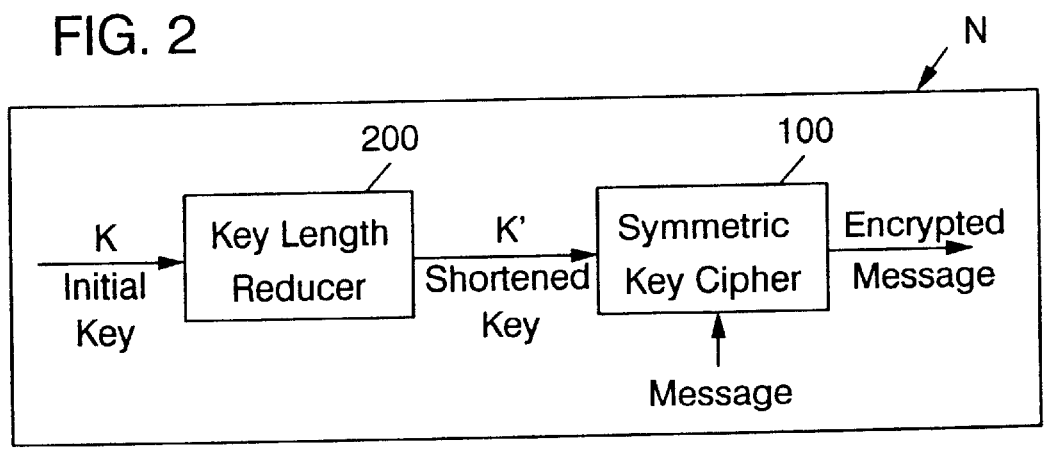
FIG. 2 illustrates a node of FIG. 1 according to the invention.

FIG. 2 illustrates a node N according to the invention. Node N may perform many different functions depending upon the configuration of the node. As shown in FIG. 2, node N includes a symmetric key cipher 100 that encrypts a message with a key to produce an encrypted message using any one of many conventional techniques well known to those having skill in the art. The design and operation of symmetric key cipher 100 is well known to those having skill in the art and need not be described further herein.

Still referring to FIG. 2, node N also includes a key length reducer 200. The key length reducer 200 is responsive to an initial key K to produce a shortened key K' having a reduced effective key length.

Figure 3A:
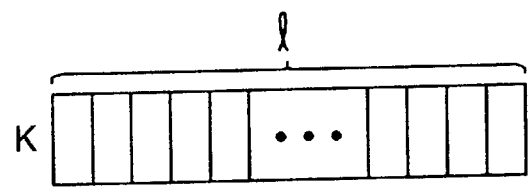
FIGS. 3A and 3B illustrate an initial key and a shortened key respectively, according to the present invention.
Figure 3B:
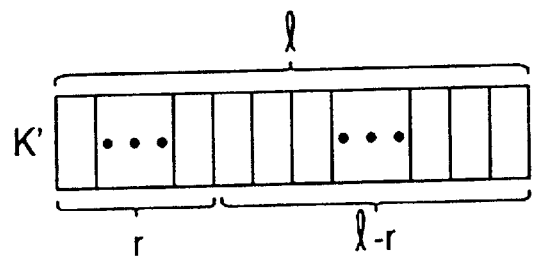

FIG. 3A illustrates an initial key K of length l FIG. 3B illustrates a shortened key K' of length l that has been shortened by r bits so that the effective length of K' is l–r bits.

The key length reducer 200 of FIG. 2 may be embodied as methods, systems (apparatus), and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Various aspects of the present invention are illustrated in detail in the following Figures, including flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As was already described, the key length reducer 200 derives a shortened key from an initial key by performing at least one one-way cryptographic function using the initial key and no other key. The one-way cryptographic function can be a one-way hash function and/or the symmetric key cipher 100 itself.

Hash-based key length reducing uses a strong collision-resistant one-way hash function H (such as the well known SHA-1) and the initial key to derive a shortened key. The function H generates an n-bit output from any length input. For example, SHA-1 generates a 160-bit output value from an input value of any length. Hash-based key shortening may be described mathematically as follows:

1. Let S1=H(K)∥H(K+1)∥H(K+2)∥ . . . ∥H(K+a) where a=$\lceil l/n \rceil$–1, and $\lceil x \rceil$ denotes the smallest integer greater than or equal to x. For example, if x=3.2, then $\lceil x \rceil$=4. The symbol "∥" denotes the concatenation operation.
2. Let S2 be l specific bits of S1 (e.g., the l left-most bits of S1).
3. Fix or set r specific bits of S2 to some constant (predetermined) values (e.g., the r left-most bits of S2 are set to zero). Let S3 denote this modified S2.
4. Let S4=H(S3)∥H(S3+1)∥H(S3+2)∥ . . . ∥H(S3+a)
5. Let K' be l specific bits of S4 (e.g., the l left-most bits of S4).

Figure 4:
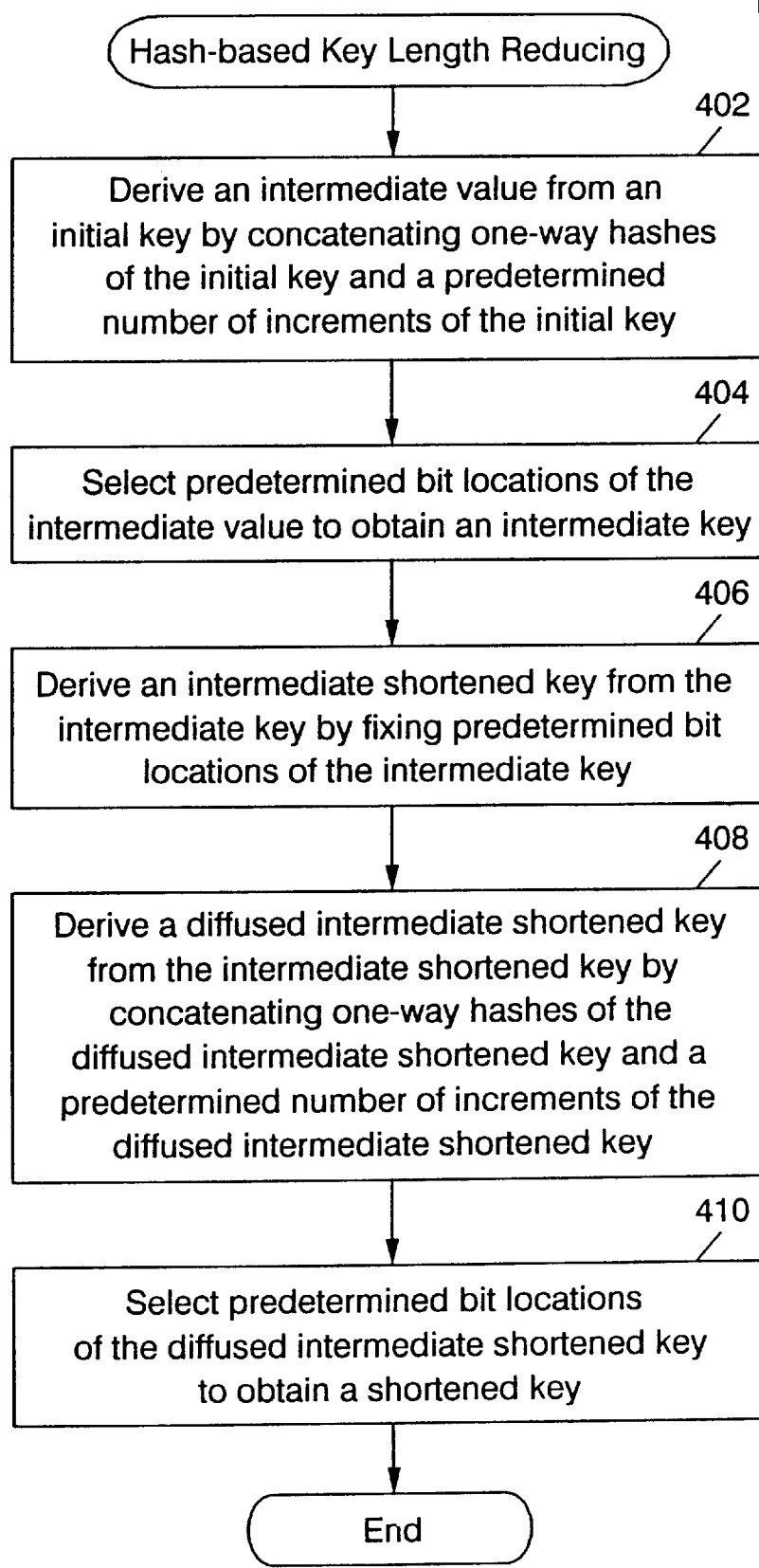
FIG. 4 illustrates hash-based key length reducing according to the present invention.

Referring now to FIG. 4, hash-based key shortening will be described. At Block 402 (operation 1 above), an intermediate value S1 is derived from the initial key K using a strong collision-resistant one-way hash function H. Block 402 protects the value of the initial key. Since S1 is obtained from K using a one-way function, it is infeasible to derive K from S1. Therefore, no information about K is revealed if S1 is exposed.

At Block 404 (operation 2 above), an intermediate key S2 is obtained by selecting l bits of S1. The intermediate key S2 is of the same length as the initial key K and has the same effective key length l.

In Block 406 (operation 3 above), an intermediate shortened key S3 is derived from the intermediate key S2 by fixing or setting r bits of S2 to some publicly known constant values. The effective key length of S3 is therefore l–r bits.

Block 408 (operation 4 above) then derives a diffused value S4 from the intermediate shortened key S3 using an operation similar to Block 402. Block 408 scatters the l–r independent bits of S3 throughout S4, thus eliminating the recognizable pattern of the r fixed bits defined in Block 406.

Finally, in Block 410 (operation 5 above), a shortened key K' is obtained by selecting l bits of S4. The shortened key K' obtained using hash-based key length reducing is l bits long but has an effective key length of l–r bits. That is, there are $2^{l-r}$ possible values for K'.

Cipher-based key length reducing uses the cipher itself and the initial key to derive a shortened key. A symmetric-key cipher E generates an n-bit output from an n-bit input. For example, for DES the input (plaintext) and output (ciphertext) are 64 bits long (i.e., n=64 bits). Cipher-based key shortening may be described mathematically as follows:

1. Pad K as necessary to make its length an integer multiple of n bits (e.g., append 0's). Let S denote the padded K. Let m=∥S∥/n, where ∥S∥ denotes the length of S in bits. Then, divide S into m sub-blocks each of length n bits such that S=$s_1,s_2, \ldots s_m$, where $s_1$ is the least significant sub-block of S.
2. Let T=F(S)∥F(S+1mod$2^{m \times n}$)∥F(S+2mod$2^{m \times n}$)∥ . . . ∥F(S+amod$2^{m \times n}$) where a=$\lceil l/n \rceil$–1 and F(S)=$F_m$ is defined using the following recursive function:

$$F_i = \begin{cases} 0 & \text{if } i = 0 \\ F_{i-1} \oplus s_i \oplus E_K(s_i) & \text{if } i > 0 \end{cases}$$

Note that in the above definition, $E_K(s_i)$ denotes encryption of $s_i$ under the key K.
3. Let U be l specific bits of T (e.g., the l left-most bits of T).
4. Fix or set r specific bits of U to some constant (predetermined) values (e.g., the r left-most bits of U are set to zero). Let V denote this modified U.
5. Pad V as necessary to make its length an integer multiple of n bits (e.g., append 0's). Let W denote the padded V. Let m=∥W∥/n, where ∥W∥ denotes the length of W in bits. Then, divide W into m sub-blocks each of length n bits such that W=$w_1,w_2, \ldots w_m$, where $w_1$ is the least significant sub-block of S.

6. Let $X=F(W)\|F(W+1\bmod 2^{m\times n})\|F(W+2\bmod 2^{m\times n})\| \ldots \|F(W+a\bmod 2^{m\times n})$ where $a=\lceil l/n \rceil-1$ and $F(W)=F_m$ is defined using the following recursive function:

$$F_i = \begin{cases} 0 & \text{if } i = 0 \\ F_{i-1} \oplus w_i \oplus E_V(w_i) & \text{if } i > 0 \end{cases}$$

Note that in the above definition, $E_V(w_i)$ denotes encryption of $w_i$ under the key V.

7. Let K' be l specific bits of X (e.g., the l left-most bits of X).

Figure 5:
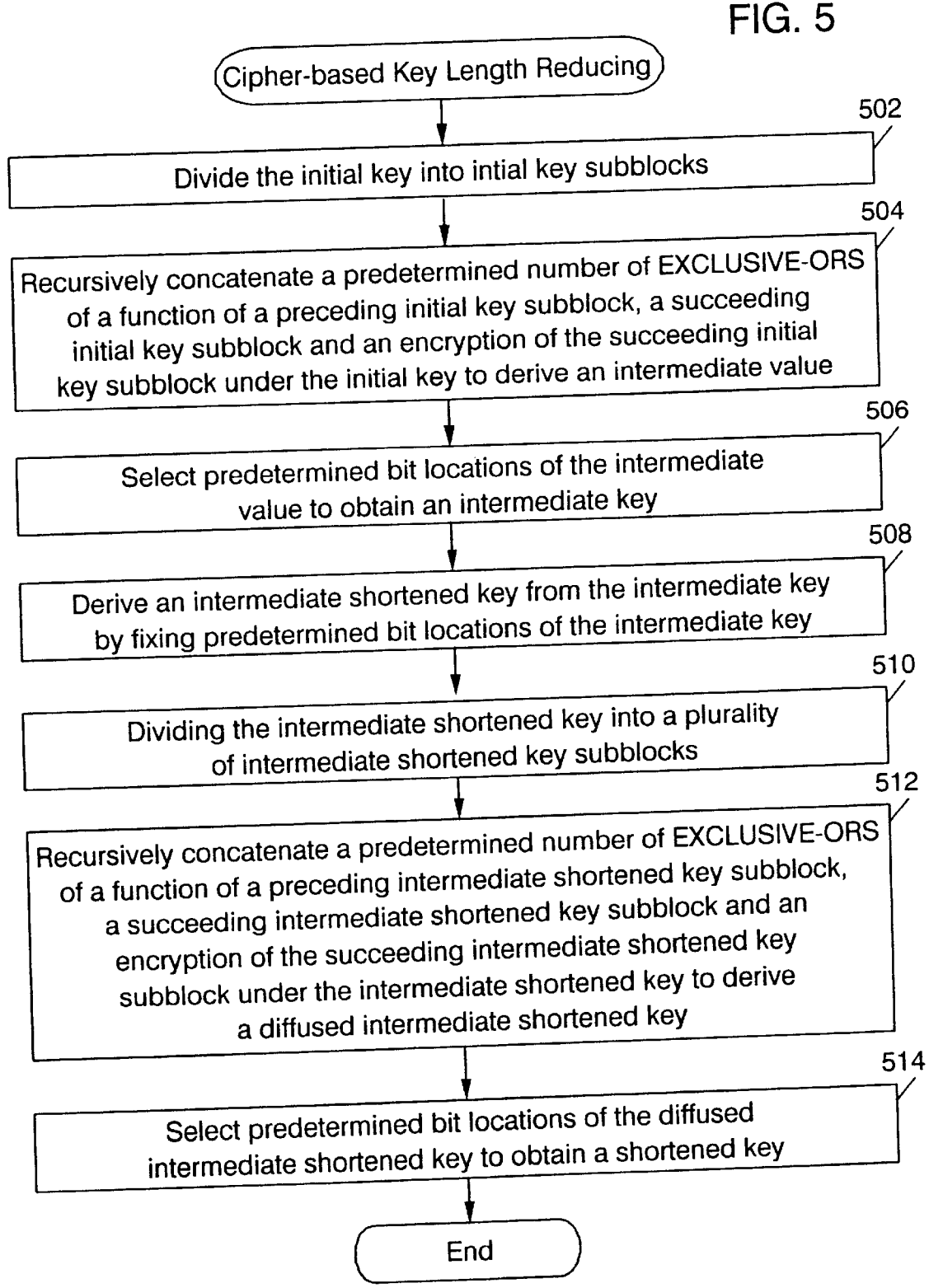
FIG. 5 illustrates cipher-based key length reducing according to the present invention.

Referring now to FIG. 5, cipher-based key shortening will be described. At Block 502 (operation 1 above), a padded key S is generated from the initial key K to make the length of the key an integer multiple of the cipher block size. At Block 504 (operation 2 above), an intermediate value T is derived from the initial padded key S using the cipher E itself.

Block 504 defines a cryptographic one-way function F using the cipher E. Block 504 protects the value of the initial key. Since T is obtained from S using a one-way function, it is infeasible to derive S from T. Therefore, no information about S is revealed if T is exposed.

At Block 506 (operation 3 above), an intermediate key U is obtained by selecting l bits of T. The intermediate key U is of the same length as the initial key K and has the same effective key length l.

Block 508 (operation 4 above) derives an intermediate shortened key V from the intermediate key U by fixing or setting r bits of U to some publicly known constant values. The effective key length of V is therefore l–r bits. Block 510 (operation 5 above) generates a padded intermediate shortened key W from the intermediate shortened key V to make the length of the key an integer multiple of the cipher block size.

Block 512 (operation 6 above) then derives a diffused value X from the padded intermediate shortened key W similar to Block 504. This operation scatters the l–r independent bits of W throughout X, thus eliminating the recognizable pattern of the r fixed bits defined in Block 508.

At Block 514 (operation 7 above), a shortened key K' is obtained by selecting l bits of X. The shortened key K' obtained using cipher-based key length reducing is l bits long but has an effective key length of l–r bits. That is, there are $2^{l-r}$ possible values for K'.

Accordingly, effective key lengths may be reduced in symmetric-key ciphers. The invention can use any cipher and any size key and can generate a shortened key which is of the same length as an initial (long) key. One embodiment can use any strong collision-resistant one-way hash function and the initial key to derive a shortened key. Another embodiment uses the cipher itself and the initial key to generate a shortened key. The invention need not modify the existing key management systems and can work for both pre-established and dynamically established keys. Existing key exchange protocols can be used to distribute long keys which are shortened by the invention. The invention can be cryptographically strong and can produce shortened keys that are not susceptible to short-cut attacks. Additionally, exposure of the shortened key may not reveal any information about the initial key.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of reducing effective key length of a symmetric key cipher comprising the steps of:
   deriving an intermediate value from an initial key, using a one-way cryptographic function;
   selecting predetermined bit locations of the intermediate value to obtain an intermediate key;
   deriving an intermediate shortened key from the intermediate key by setting predetermined bit locations of the intermediate key to predetermined values;
   deriving a diffused intermediate shortened key from the intermediate shortened key, using the one-way cryptographic function; and
   selecting predetermined bit locations of the diffused intermediate shortened key to obtain a shortened key.

2. A method according to claim 1 wherein the one-way cryptographic function is a one-way hash function.

3. A method according to claim 2:
   wherein the step of deriving an intermediate value from an initial key comprises the step of concatenating one-way hashes of the initial key and a predetermined number of increments of the initial key; and
   wherein the step of deriving a diffused intermediate shortened key from the intermediate shortened key comprises the step of concatenating one-way hashes of the diffused intermediate shortened key and a predetermined number of increments of the diffused intermediate shortened key.

4. A method according to claim 1 wherein the one-way cryptographic function is the symmetric key cipher.

5. A method according to claim 4:
   wherein the step of deriving an intermediate value from an initial key is preceded by the step of dividing the initial key into a plurality of initial key subblocks;
   wherein the step of deriving an intermediate value from an initial key comprises the step of recursively concatenating a predetermined number of EXCLUSIVE-ORs of a function of a preceding initial key subblock, a succeeding initial key subblock and an encryption of the succeeding initial key subblock under the initial key;
   wherein the step of deriving a diffused intermediate shortened key from the intermediate shortened key is preceded by the step of dividing the intermediate shortened key into a plurality of intermediate shortened key subblocks; and
   wherein the step of deriving a diffused intermediate shortened key from the intermediate shortened key comprises the step of recursively concatenating a predetermined number of EXCLUSIVE-ORs of a function of a preceding intermediate shortened key subblock, a succeeding intermediate shortened key subblock and an encryption of the succeeding intermediate shortened key subblock under the intermediate shortened key.

6. A method according to claim 5:
   wherein the step of dividing the initial key into a plurality of initial key subblocks comprises the step of padding the initial key; and
   wherein the step of dividing the intermediate shortened key into a plurality of intermediate shortened key subblocks comprises the step of padding the intermediate shortened key.

7. A method of reducing effective key length of a symmetric key cipher comprising the step of:
   deriving a shortened key from an initial key by performing at least one one-way cryptographic function using the initial key and no other key.

8. A method according to claim 7 wherein the deriving step comprises the step of deriving a shortened key from an initial key by applying at least one of a one-way hash function and the symmetric key cipher using the initial key and no other key.

9. A system for reducing effective key length of a symmetric key cipher comprising:
   means for deriving an intermediate value from an initial key, using a one-way cryptographic function;
   means for selecting predetermined bit locations of the intermediate value to obtain an intermediate key;
   means for deriving an intermediate shortened key from the intermediate key by setting predetermined bit locations of the intermediate key to predetermined values;
   means for deriving a diffused intermediate shortened key from the intermediate shortened key, using the one-way cryptographic function; and
   means for selecting predetermined bit locations of the diffused intermediate shortened key to obtain a shortened key.

10. A system according to claim 9 wherein the one-way cryptographic function is a one-way hash function.

11. A system according to claim 10:
   wherein the means for deriving an intermediate value from an initial key comprises means for concatenating one-way hashes of the initial key and a predetermined number of increments of the initial key; and
   wherein the means for deriving a diffused intermediate shortened key from the intermediate shortened key comprises means for concatenating one-way hashes of the diffused intermediate shortened key and a predetermined number of increments of the diffused intermediate shortened key.

12. A system according to claim 9 wherein the one-way cryptographic function is the symmetric key cipher.

13. A system according to claim 12 further comprising:
   means for dividing the initial key into a plurality of initial key subblocks; and
   means for dividing the intermediate shortened key into a plurality of intermediate shortened key subblocks;
   wherein the means for deriving an intermediate value from an initial key comprises means for recursively concatenating a predetermined number of EXCLUSIVE-ORs of a function of a preceding initial key subblock, a succeeding initial key subblock and an encryption of the succeeding initial key subblock under the initial key; and
   wherein the means for deriving a diffused intermediate shortened key from the intermediate shortened key comprises means for recursively concatenating a predetermined number of EXCLUSIVE-ORs of a function of a preceding intermediate shortened key subblock, a succeeding intermediate shortened key subblock and an encryption of the succeeding intermediate shortened key subblock under the intermediate shortened key.

14. A system according to claim 13:
   wherein the means for dividing the initial key into a plurality of initial key subblocks comprises means for padding the initial key; and
   wherein the means for dividing the intermediate shortened key into a plurality of intermediate shortened key subblocks comprises means for padding the intermediate shortened key.

15. A cipher system comprising:
   a key length reducer that derives a shortened key from an initial key by performing at least one one-way cryptographic function using the initial key and no other key; and
   a symmetric key cipher that encrypts a message under the shortened key.

16. A system according to claim 15 wherein the key length reducer derives a shortened key from an initial key by applying at least one of a one-way hash function and the symmetric key cipher using the initial key and no other key.

17. A computer program product for reducing effective key length of a symmetric key cipher, the computer program product comprising a computer-readable storage medium having computer-readable program code means embodied in the medium, the computer-readable program code means comprising:
   computer-readable program code means for deriving an intermediate value from an initial key, using a one-way cryptographic function;
   computer-readable program code means for selecting predetermined bit locations of the intermediate value to obtain an intermediate key;
   computer-readable program code means for deriving an intermediate shortened key from the intermediate key by setting predetermined bit locations of the intermediate key to predetermined values;
   computer-readable program code means for deriving a diffused intermediate shortened key from the intermediate shortened key, using the one-way cryptographic function; and
   computer-readable program code means for selecting predetermined bit locations of the diffused intermediate shortened key to obtain a shortened key.

18. A computer program product according to claim 17 wherein the one-way cryptographic function is a one-way hash function.

19. A computer program product according to claim 18:
   wherein the computer-readable program code means for deriving an intermediate value from an initial key comprises computer-readable program code means for concatenating one-way hashes of the initial key and a predetermined number of increments of the initial key; and
   wherein the computer-readable program code means for deriving a diffused intermediate shortened key from the intermediate shortened key comprises computer-readable program code means for concatenating one-way hashes of the diffused intermediate shortened key and a predetermined number of increments of the diffused intermediate shortened key.

20. A computer program product according to claim 17 wherein the one-way cryptographic function is the symmetric key cipher.

21. A computer program product according to claim 20 further comprising:
   computer-readable program code means for dividing the initial key into a plurality of initial key subblocks; and
   computer-readable program code means for dividing the intermediate shortened key into a plurality of intermediate shortened key subblocks;
   wherein the computer-readable program code means for deriving an intermediate value from an initial key comprises computer-readable program code means for recursively concatenating a predetermined number of EXCLUSIVE-ORs of a function of a preceding initial key subblock, a succeeding initial key subblock and an encryption of the succeeding initial key subblock under the initial key; and
   wherein the computer-readable program code means for deriving a diffused intermediate shortened key from the intermediate shortened key comprises computer-readable program code means for recursively concatenating a predetermined number of EXCLUSIVE-ORs of a function of a preceding intermediate shortened key subblock, a succeeding intermediate shortened key subblock and an encryption of the succeeding intermediate shortened key subblock under the intermediate shortened key.

22. A computer program product according to claim 21:
wherein the computer-readable program code means for dividing the initial key into a plurality of initial key subblocks comprises computer-readable program code means for padding the initial key; and
wherein the computer-readable program code means for dividing the intermediate shortened key into a plurality of intermediate shortened key subblocks comprises computer-readable program code means for padding the intermediate shortened key.

23. A computer program product cipher comprising a computer-readable storage medium having computer-readable program code means embodied in the medium, the computer-readable program code means comprising:
computer-readable program code means for deriving a shortened key from an initial key by performing at least one one-way cryptographic function using the initial key and no other key; and
computer-readable program code means for symmetric key encrypting a message under the shortened key.

24. A computer program product cipher according to claim 23 wherein the computer-readable program code means for deriving comprises computer-readable program code means for deriving a shortened key from an initial key by applying at least one of a one-way hash function and the symmetric key cipher using the initial key and no other key.

* * * * *